US012226890B2

(12) United States Patent
Malik

(10) Patent No.: US 12,226,890 B2
(45) Date of Patent: Feb. 18, 2025

(54) WRENCH ORGANIZING ASSEMBLY AND METHOD OF USE

(71) Applicant: Akram M. Malik, Azle, TX (US)

(72) Inventor: Akram M. Malik, Azle, TX (US)

( * ) Notice: Subject to any disclaimer, the term of this patent is extended or adjusted under 35 U.S.C. 154(b) by 105 days.

(21) Appl. No.: 18/133,689

(22) Filed: Apr. 12, 2023

(65) Prior Publication Data

US 2024/0342892 A1 Oct. 17, 2024

(51) Int. Cl.
*B25H 3/00* (2006.01)
*B25H 3/04* (2006.01)

(52) U.S. Cl.
CPC ............... *B25H 3/006* (2013.01); *B25H 3/04* (2013.01)

(58) Field of Classification Search
CPC .................................. B25H 3/006; B25H 3/04
See application file for complete search history.

(56) References Cited

U.S. PATENT DOCUMENTS 1,078,729 A 11/1913 Hill
1,243,173 A 10/1917 Hinckley
2,033,430 A * 3/1936 Kirik .................... A47G 25/746 211/95
3,314,177 A * 4/1967 Mies, Jr. et al. ........ B42F 17/08 211/115
3,472,389 A * 10/1969 Lowe ................... A47G 25/746 211/163
4,121,720 A * 10/1978 Hayes ................... A47F 5/0892 211/113
4,240,684 A * 12/1980 Henning .................. B25H 3/04 312/215
4,266,835 A 5/1981 Schmidt
4,290,531 A 9/1981 Lazarus, III
4,415,080 A * 11/1983 Romine ................. B65D 85/62 206/349
4,534,471 A * 8/1985 Zahn ........................ B41K 1/58 211/163
4,538,862 A * 9/1985 Chandler ............... B65D 25/10 312/283
4,865,194 A 9/1989 Decarie
5,228,582 A * 7/1993 Marshall ................... A47F 5/02 211/163
5,337,904 A * 8/1994 Goldberg .................. A47F 5/04 211/26.1
5,344,012 A 9/1994 Matthews (Continued)

FOREIGN PATENT DOCUMENTS

EP 2366501 A2 * 9/2011 ............. B25B 15/02
GB 2366721 A * 3/2002 ............. A47B 49/00

(Continued)

*Primary Examiner* — Stanton L Krycinski

(57) ABSTRACT

A wrench organizing assembly includes a base, which is selectively positionable upon a substantially horizontal surface. A pipe is attached to and extends upwardly from a top of the base. A plate is rotatably attached to the pipe proximate to an upper end of the pipe, with the plate being parallel to the top of the base. A plurality of hangers is selectively attachable to the plate so that a hook segment of each hanger is positioned between the plate and the base. A tool, such as a wrench, can be hung from each hook segment so that a plurality of wrenches can be organized by size and readily accessed by rotation of the plate relative to the base.

9 Claims, 6 Drawing Sheets

(56) References Cited

U.S. PATENT DOCUMENTS

| | | | | | |
|---|---|---|---|---|---|
| 5,379,885 | A * | 1/1995 | Chen | B25H 3/04 | 211/163 |
| 5,799,789 | A | 9/1998 | Ritchie et al. | | |
| 5,836,446 | A * | 11/1998 | Varnom | B25H 3/026 | 211/70.6 |
| D408,285 | S | 4/1999 | Farve | | |
| 6,105,768 | A * | 8/2000 | Brown | B25H 3/025 | 211/70.6 |
| 6,241,105 | B1 * | 6/2001 | Pomper | A47F 5/04 | 211/85.2 |
| 6,254,055 | B1 * | 7/2001 | Lamberson, Jr. | A01K 97/10 | 206/315.11 |
| 6,273,277 | B1 * | 8/2001 | Geldenhuys | B25H 3/04 | 211/115 |
| 6,360,891 | B1 * | 3/2002 | Rideout | F21V 21/0885 | 206/372 |
| 6,454,231 | B1 * | 9/2002 | Fischer | B25H 3/025 | 248/220.31 |
| 6,808,067 | B2 | 10/2004 | Benatz et al. | | |
| 7,159,735 | B2 * | 1/2007 | Morse | B25H 3/026 | 206/427 |
| 7,686,250 | B2 * | 3/2010 | Fortes | B64D 43/00 | 211/115 |
| 7,717,277 | B2 * | 5/2010 | Meinhardt | B25H 3/06 | 312/330.1 |
| 7,832,568 | B2 * | 11/2010 | Wu | A47B 81/04 | 211/85.29 |
| 7,954,650 | B1 * | 6/2011 | Malik | B25H 3/04 | 211/70.6 |
| 8,127,965 | B1 * | 3/2012 | Miller | B25H 3/04 | 220/528 |
| 8,770,419 | B2 * | 7/2014 | Carlton | B25H 3/04 | 211/70.6 |
| 8,851,283 | B2 * | 10/2014 | Wu | A47G 7/06 | 206/234 |
| 9,956,684 | B2 * | 5/2018 | Welfel | B25H 3/06 | |
| 10,434,640 | B1 * | 10/2019 | Lennon | B25H 3/04 | |
| 10,793,317 | B2 * | 10/2020 | Bowen | B65D 25/04 | |
| 11,096,336 | B2 * | 8/2021 | Wu | B65D 1/34 | |
| 2002/0190015 | A1 * | 12/2002 | Dietrich | B25H 3/04 | 211/70.6 |
| 2006/0065564 | A1 | 3/2006 | McCarty et al. | | |
| 2006/0065613 | A1 * | 3/2006 | McKay | A47F 5/02 | 211/85.2 |
| 2006/0243687 | A1 * | 11/2006 | Hilger | A47F 5/02 | 211/106.01 |
| 2007/0012586 | A1 * | 1/2007 | Wang | B25H 3/06 | 206/379 |
| 2008/0169252 | A1 * | 7/2008 | O'Risky | B25H 3/025 | 211/70.6 |
| 2011/0068022 | A1 * | 3/2011 | Koch, III | B25H 3/06 | 248/224.8 |

FOREIGN PATENT DOCUMENTS

| | | | | |
|---|---|---|---|---|
| GB | 2473520 | A * | 3/2011 | B25H 3/04 |
| JP | 2010000574 | A * | 1/2010 | |

* cited by examiner

WRENCH ORGANIZING ASSEMBLY AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tool organizing devices and more particularly pertains to a new tool organizing device for organizing a plurality of wrenches and a plurality of sockets. The present invention discloses a tool organizing device that allows for hanging of a plurality of wrenches in an organized manner and which allows for easy access to a required wrench by rotating a plate from which the wrenches hang.

(2) Description of Related Art Including Information Disclosed Under 37 CFR 1.97 and 1.98

The prior art relates to tool organizing devices, with the most relevant prior art being U.S. Pat. No. 7,954,650B1, the sole inventor of which is also the sole inventor of the present invention, which includes novel improvements to the prior art. Specifically, the tool organizing device disclosed herein has a rotating plate from which the tools are hung, which facilitates selection of a desired tool. Additionally, the present invention includes a handle operationally engaged to the plate to facilitate its rotation.

BRIEF SUMMARY OF THE INVENTION

An embodiment of the disclosure meets the needs presented above by generally comprising a base, which is selectively positionable upon a substantially horizontal surface. A pipe is attached to and extends upwardly from a top of the base. A plate is rotatably attached to the pipe proximate to an upper end of the pipe, with the plate being parallel to the top of the base. A plurality of hangers is selectively attachable to the plate so that a hook segment of each hanger is positioned between the plate and the base. The hook segment is configured for hanging of a tool, such as a wrench. Wrenches attached to the hangers can be organized by size and readily accessed by rotation of the plate relative to the base.

Another embodiment of the disclosure includes a method of organizing and accessing wrenches. Steps of the method include selecting a respective wrench from a plurality of wrenches based on a size of the respective wrench, hanging the respective wrench on a respective hanger of a plurality of hangers attached to a plate, repeating the selection and hanging steps until all of the wrenches are hung in sequence from the hangers based on their sizes, rotating the plate to position a respective wrench required for use to a position wherein the wrench is visible to a user, and removing the respective wrench from the hanger.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
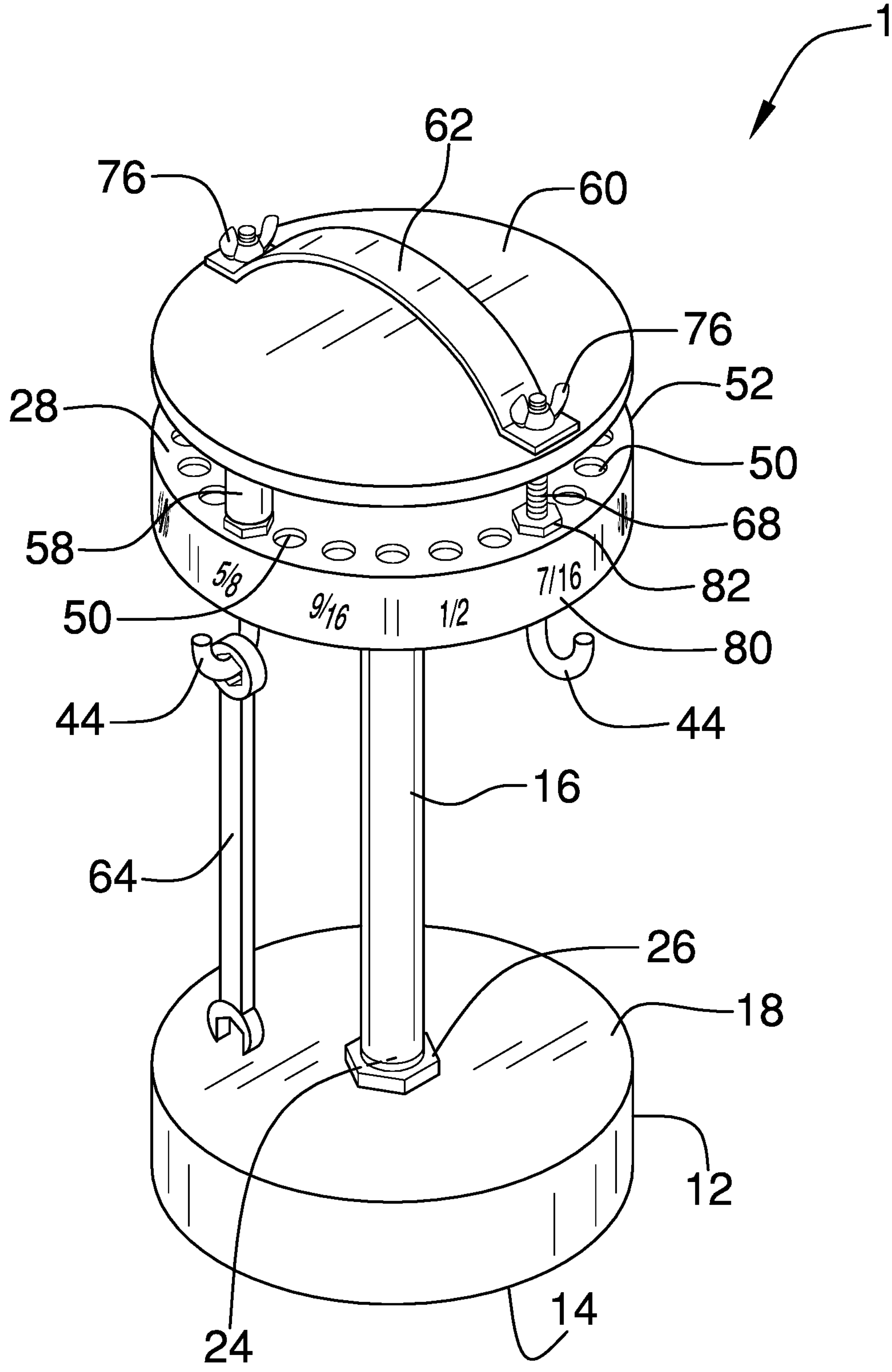
FIG. 1 is an isometric perspective view of a wrench organizing assembly of an embodiment of the disclosure.

With reference now to the drawings, and in particular to FIGS. 1 through 6 thereof, a new tool organizing device embodying the principles and concepts of an embodiment of the disclosure and generally designated by the reference numeral 10 will be described.

Figure 2:
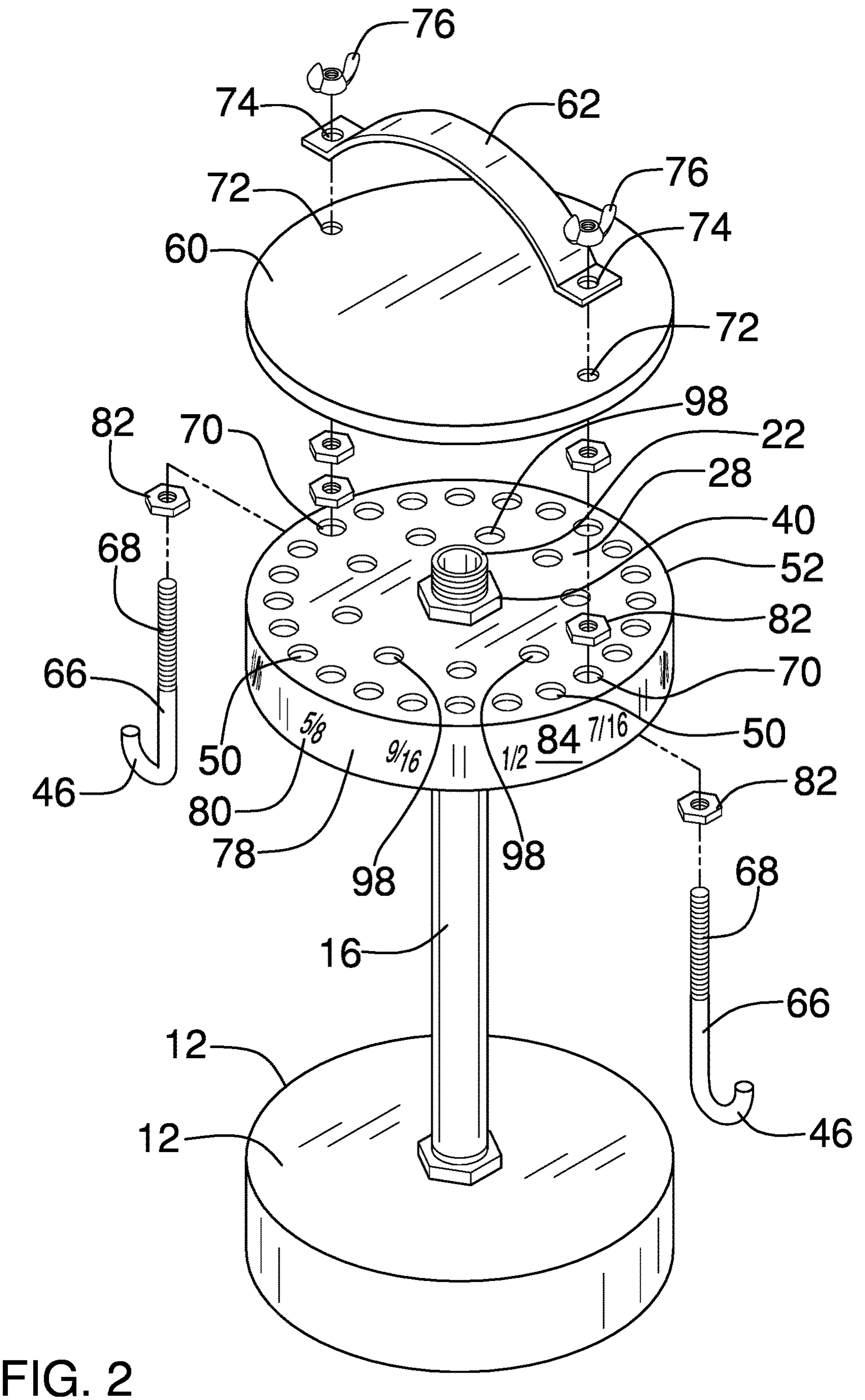
FIG. 2 is an exploded view of an embodiment of the disclosure.
Figure 3:
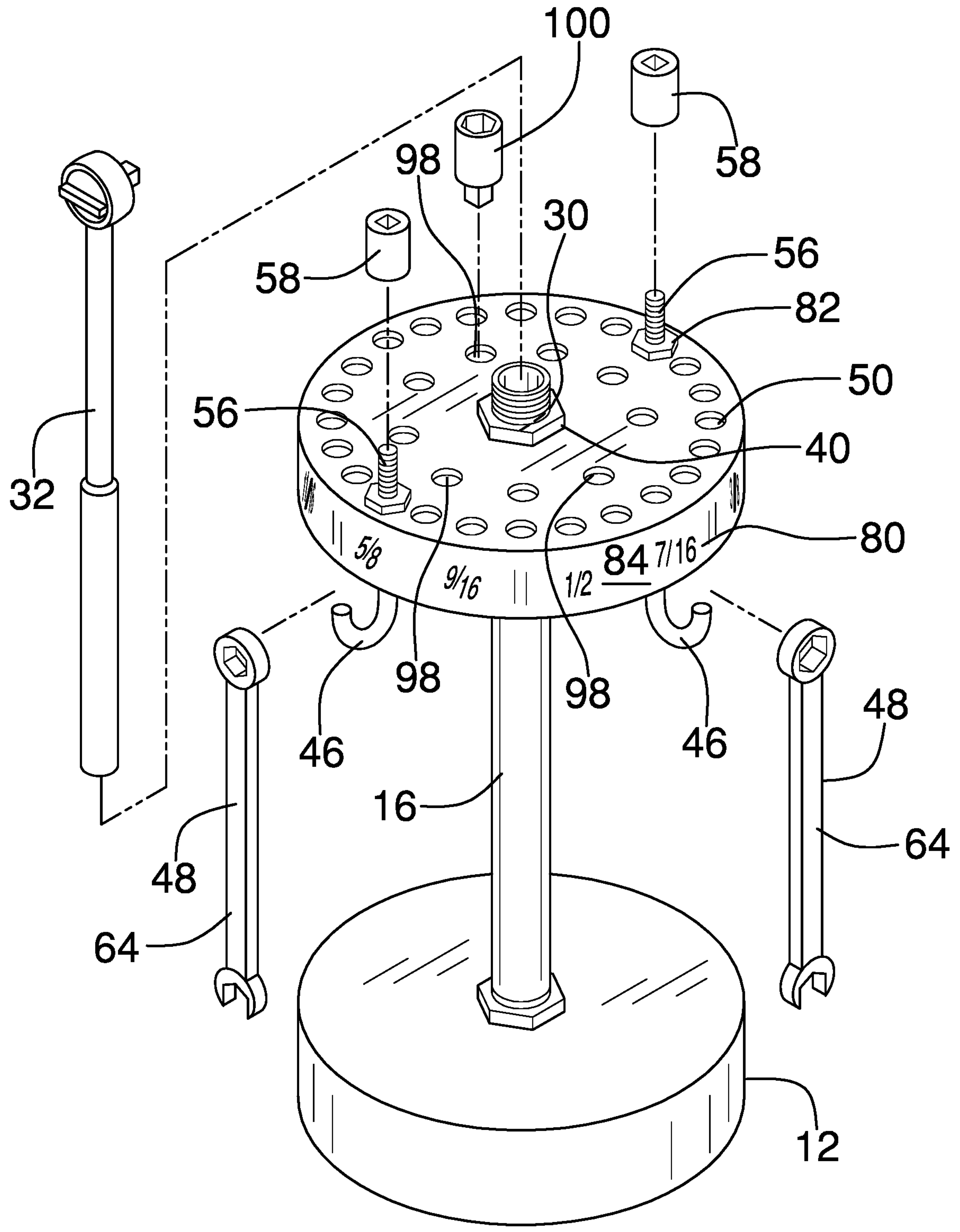
FIG. 3 is an in-use view of an embodiment of the disclosure.

As best illustrated in FIGS. 1 through 6, the wrench organizing assembly 10 generally comprises a base 12, which is selectively positionable upon a substantially horizontal surface. A bottom 14 of the base 12 is open. The base 12 may be disc shaped, as is shown in FIGS. 1-3. As shaping of the base 12 is not essential to functioning of the wrench organizing assembly 10, alternative shaping of the base 12, such as cuboid, triangular prism, or the like, also is anticipated.

A pipe 16 is attached to and extends upwardly from a top 18 of the base 12. The pipe 16 is externally threaded adjacent to a lower end 20 of the pipe 16 and adjacent to an upper end 22 of the pipe 16. The pipe 16 extends through a cutout 24 in the top 18 of the base 12 so that the lower end 20 protrudes into the base 12. An inner locking nut 26 is threadedly attached to the pipe 16 and is positioned in the base 12 so that the inner locking nut 26 removably attaches the pipe 16 to the base 12. As is shown in FIG. 1, an additional inner locking nut 26 may be threadedly attached to the pipe 16 and positioned on the top 18 of the base 12 to further secure the pipe 16 to the base 12. The present invention also anticipates the pipe 16 being permanently attached to the base 12, such as by means of welding.

Figure 4:
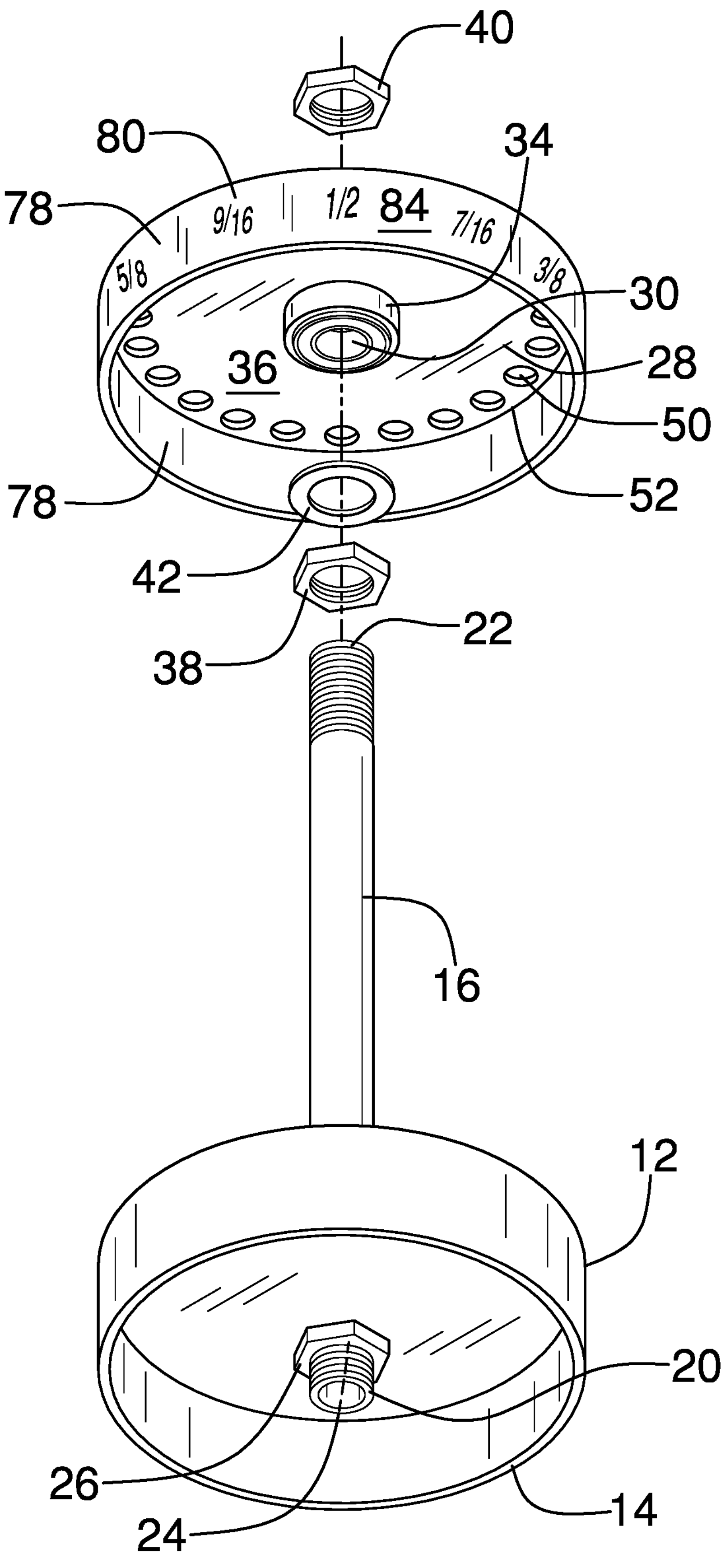
FIG. 4 is a bottom isometric perspective view of an embodiment of the disclosure.

A plate 28 is rotatably attached to the pipe 16 proximate to an upper end 22 of the pipe 16, with the plate 28 being parallel to the top 18 of the base 12. The pipe 16 extends through an orifice 30 in the plate 28 so that the upper end 22 protrudes from the plate 28. The upper end 22 of the pipe 16 is configured for selective insertion of an elongated tool 32, such as a socket wrench, as is shown in FIG. 3, a ratchet wrench, or the like. As is shown in FIG. 4, a bearing 34 is attached to a lower face 36 of the plate 28 and extends circumferentially around the orifice 30. A lower locking nut 38 and an upper locking nut 40 are threadedly attached to the pipe 16 and are positioned below the bearing 34 and above the plate 28, respectively. A washer 42 is positioned between the lower locking nut 38 and the bearing 34. The upper locking nut 40 and the lower locking nut 38 are positioned to be rotated to attach the plate 28 to the pipe 16. The present invention also anticipates the plate 28 being fixedly attached to the pipe 16 and the pipe 16 being rotatably attached to the base 12.

A plurality of hangers 44 is selectively attachable to the plate 28 so that a hook segment 46 of each hanger 44 is positioned between the plate 28 and the base 12. The hook segment 46 is configured to allow for hanging of a tool 64, such as a wrench 48. Wrenches 48 attached to the hangers 44 can be organized by size and readily accessed by rotation of the plate 28 relative to the base 12.

A plurality of holes 50 is positioned in the plate 28 and extends circumferentially around the plate 28 proximate to a perimeter 52 of the plate 28. Each hanger 44 comprises a threaded segment 54, to which the hook segment 46 is attached. The threaded segment 54 is removably insertable upwardly through a respective hole 50 so that the hanger 44 is selectively securable to the plate 28 using a pair of lock nuts 82 positioned on the threaded segment 54 and bracketing the plate 28.

As is shown in FIG. 3, a section 56 of the threaded segment 54 protrudes upwardly from the plate 28. The section 56 of the threaded segment 54 is configured for selective insertion into a socket 58 so that the socket 58 is removably attached to the plate 28. The sections 56 of the threaded segments 54 protruding upwardly from the plate 28 allow for organization of a plurality of sockets 58. A cover 60 is selectively attachable to the plate 28 and covers the sections 56 of the threaded segments 54 and the sockets 58, thereby retaining sockets 58 is position.

A handle 62 is selectively attachable to the cover 60. The handle 62 is configured to be grasped in a hand of a user, positioning the user to selectively rotate the plate 28 to select a respective tool 64 attached to a respective hanger 44. The user is enabled to lift the wrench organizing assembly 10 and the tools 64. The present invention also anticipates the handle 62 being fixedly attached to the cover 60, such as by means of welding. The present invention also anticipates the handle 62 being attached directly to the plate 28 without the cover 60 being used.

Figure 5:
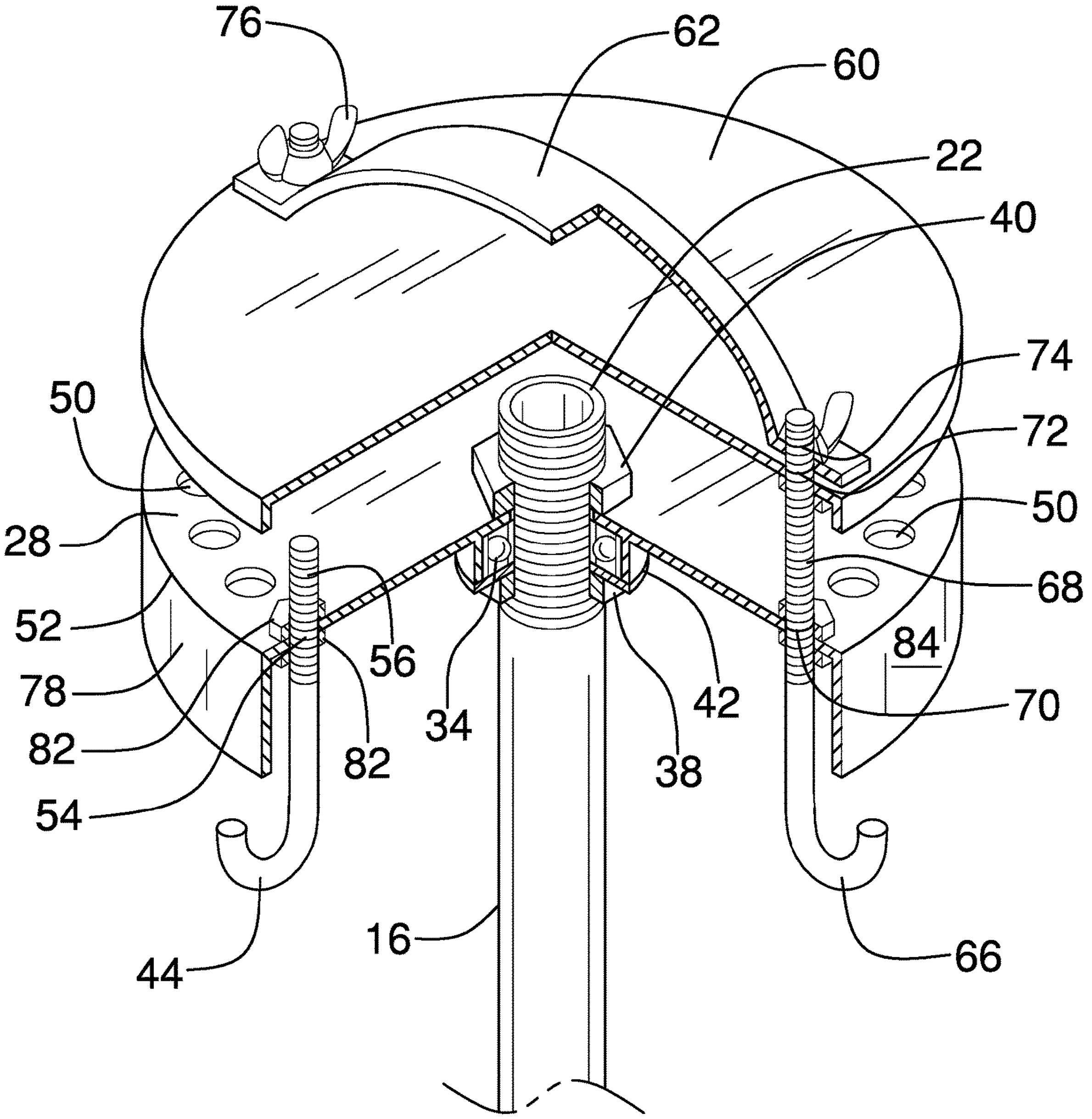
FIG. 5 is a partial sectional view of an embodiment of the disclosure.
Figure 6:
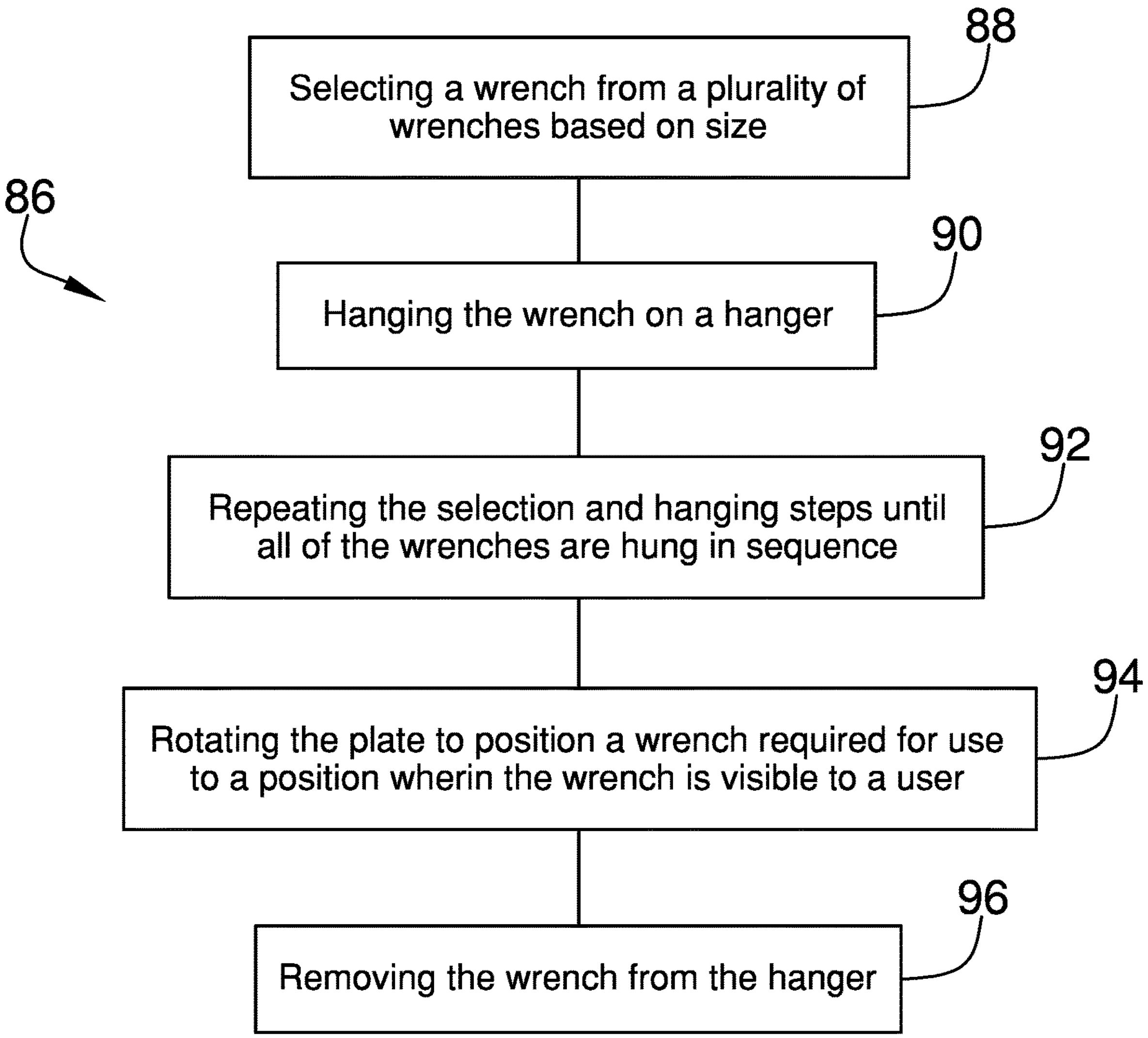
FIG. 6 is a flow diagram for a method utilizing an embodiment of the disclosure.

As is shown in FIG. 2, each hanger 44 of a pair 66 of the hangers 44 comprises an elongated threaded segment 68. The elongated threaded segments 68 are positioned singly through the holes 50 of a pair 70 of holes 50 that are opposingly positioned on the plate 28. A pair of first corresponding holes 72 is positioned in the cover 60 and a pair of second corresponding holes 74 is positioned in the handle 62. The elongated threaded segments 68 are selectively insertable through the first corresponding holes 72 and the second corresponding holes 74. The cover 60 and the handle 62 thus are selectively attachable to the plate 28 by threaded attachment a pair of wingnuts 76 to the elongated threaded segments 68, as is shown in FIG. 5.

A ring 78 is attached to the perimeter 52 of the plate 28 and extends toward the base 12. Indicia 80 are positioned on an outer face 84 of the ring 78, with each indicium 80 being positioned proximate to a respective hanger 44 and indicating a size of a tool 64 attached to the respective hanger 44. The indicia 80 are configured to facilitate organization of the tools 64 based on size. The indicia 80 enhance the efficiency of the wrench organizing assembly 10 by allowing the user to more quickly find the correct size of wrench 48 or socket 58 required for a task.

As is shown in FIGS. 2 and 3, the plate 28 may have a plurality of apertures 98 positioned therein. The apertures 98 are typically circular, but also may be rectangular, and may be of a variety of sizes. The apertures 98 can be used to stow extensions 100 that are used with the elongated tool 32, particularly with the elongated tool 32 being a socket wrench. Stowage of an extension 100 is shown in FIG. 3. The apertures 98 also are anticipated to be useful in stowing other items, such as, but not limited to, specialty sockets or the like.

In use, the wrench organizing assembly 10 enables a method of organizing and accessing wrenches 86. The method 82 comprises a first step 88 of selecting a respective wrench 48 from a plurality of wrenches 48 based on a size of the respective wrench 48. A second step 90 of the method 82 is hanging the respective wrench 48 on a respective hanger 44 of a plurality of hangers 44 attached to a plate 28, which is rotatably attached to a pipe 16. The pipe 16 is attached to and extends from a base 12. A third step 92 of the method 82 is repeating the selection and hanging steps until all of the wrenches 48 are hung in sequence from the hangers 44 based on their sizes. A fourth step 94 of the method 82 is rotating the plate 28 to position a respective wrench 48 required for use to a position wherein the respective wrench 48 is visible to a user. A fifth step 96 of the method 82 is removing the respective wrench 48 from the hanger 44.

With each hanger 44 comprises a threaded segment 54, which protrudes upwardly from the plate 28, and a hook segment 46, as is described in the specification above, the step of hanging the respective wrench 48 entails hanging the respective wrench 48 from the hook segment 46.

With the wrench organizing assembly 10 comprising a cover 60 and a handle 62, as is described in the specification above, the method 82 comprises the additional steps of selecting a respective socket 58 from a plurality of sockets 58 based on a size of the respective socket 58, positioning the respective socket 58 on a section 56 of a respective threaded segment 54, and repeating the selection and positioning steps until all of the sockets 58 are positioned in sequence on the sections 56 of threaded segments 54 based on their sizes. The step of rotating the plate 28 entails grasping the handle 62 and rotating the cover 60 so that the plate 28 rotates concurrently with the handle 62 and the cover 60.

With the wrench organizing assembly 10 comprising a ring 78 upon which indicia 80 are positioned, as is described in the specification above, the step of rotating the plate 28 to position a respective wrench 48 required for use to a position wherein the wrench 48 is visible to the user is facilitated by viewing the indicium 80 corresponding to the respective wrench 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wrench organizing assembly comprising:

a base selectively positionable upon a substantially horizontal surface;

a pipe attached to and extending upwardly from a top of the base;

a plate rotatably attached to the pipe proximate to an upper end of the pipe, such that the plate is parallel to the top of the base;

a plurality of hangers selectively attachable to the plate, such that a hook segment of each hanger is positioned between the plate and the base, wherein the hook segment is configured for hanging of a tool;

a plurality of holes positioned in the plate and extending circumferentially around the plate proximate to a perimeter of the plate;

each hanger comprising a threaded segment removably insertable upwardly through a respective hole of the plurality of holes, such that the hanger is selectively securable to the plate using a pair of lock nuts positioned on the threaded segment and bracketing the plate, and the hook segment being attached to the threaded segment;

a section of the threaded segment protruding upwardly from the plate, wherein the section of the threaded segment is configured for selective insertion into a socket, such that the socket is removably attached to the plate;

a cover selectively attachable to the plate and covering the sections of the threaded segments protruding from the plate, wherein the cover is configured for retaining sockets positioned on the sections of the threaded segments; and a handle selectively attachable to the cover, wherein the handle is configured for grasping in a hand of a user, positioning the user for selectively rotating the plate for selecting a respective tool attached to a respective one of the hangers, and such that the user is enabled for lifting the base, the pipe, the plate, the hangers, and the tools.

2. The wrench organizing assembly of claim 1, further including:

a bottom of the base being open;

the pipe being externally threaded adjacent to a lower end of the pipe;

the pipe extending through a cutout in the top of the base, such that the lower end protrudes into the base; and an inner locking nut threadedly attached to the pipe and positioned in the base, such that the inner locking nut removably attaches the pipe to the base.

3. The wrench organizing assembly of claim 1, further including:

the pipe being externally threaded adjacent to the upper end;

the pipe extending through an orifice in the plate, such that the upper end of the pipe protrudes from the plate, wherein the upper end of the pipe is configured for selective insertion of an elongated tool;

a bearing attached to a lower face of the plate and extending circumferentially around the orifice;

a lower locking nut threadedly attached to the pipe and positioned below the bearing;

a washer positioned between the lower locking nut and the bearing; and an upper locking nut threadedly attached to the pipe and positioned above the plate, such that the upper locking nut and the lower locking nut are positioned for rotatably attaching the plate to the pipe.

4. The wrench organizing assembly of claim 1, further including:

each hanger of a pair of the hangers comprising an elongated threaded segment, the elongated threaded segments being positioned through a pair of holes opposingly positioned on the plate;

a pair of first corresponding holes positioned in the cover;

a pair of second corresponding holes positioned in the handle; and the elongated threaded segments being selectively insertable through the pair of first corresponding holes and the pair of second corresponding holes, such that the cover and the handle are selectively attachable to the plate by threaded attachment a pair of wingnuts to the elongated threaded segments.

5. The wrench organizing assembly of claim 1, further including:

a ring attached to the perimeter of the plate and extending toward the base; and indicia positioned on an outer face of the ring, each indicium being positioned proximate to a respective one of the hangers and indicating a size of a tool attached to the respective hanger, wherein the indicia are configured for facilitating organization of the tools based on size.

6. The wrench organizing assembly of claim 1, further including the plate having a plurality of apertures positioned therein, the apertures of the plurality of apertures being circular or rectangular, wherein each aperture is configured for partial insertion of an extension for a socket wrench, such that the extension is removably attached to the plate.

7. A method of organizing and accessing wrenches comprising the steps of:

selecting a respective wrench from a plurality of wrenches based on a size of the respective wrench;

hanging the respective wrench on a respective hanger of a plurality of hangers attached to a plate, a plurality of holes positioned in the plate and extending circumferentially around the plate proximate to a perimeter of the plate, the plate being rotatably attached to a pipe, the pipe being attached to and extending from a base, each hanger comprising a threaded segment removably insertable upwardly through a respective hole of the plurality of holes, such that the hanger is selectively securable to the plate using a pair of lock nuts positioned on the threaded segment and bracketing the plate, and a hook segment attached to the threaded segment and being positioned between the plate and the base, a section of the threaded segment protruding upwardly from the plate, a cover selectively attachable to the plate and covering the sections of the threaded segments protruding from the plate, a handle selectively attachable to the cover, wherein the handle is configured for grasping in a hand of a user;

repeating the selection and hanging steps until all of the wrenches of the plurality of wrenches are hung in sequence from the hangers based on their sizes;

rotating the plate to position a respective wrench required for use to a position wherein the respective wrench is visible to a user;

removing the respective wrench from the hanger;

the step of hanging the respective wrench entailing hanging the respective wrench from a respective hook segment;

selecting a respective socket from a plurality of sockets based on a size of the respective socket;

positioning the respective socket on a section of a respective threaded segment;

repeating the selection and positioning steps until all of the sockets of the plurality of sockets are positioned in sequence on the sections of threaded segments based on their sizes; and the step of rotating the plate entails grasping the handle and rotating the cover, such that the plate rotates concurrently with the handle and the cover.

8. The method of claim 7, further including:

the pipe being externally threaded adjacent to the upper end;

the pipe extending through an orifice in the plate, such that the upper end of the pipe protrudes from the plate, wherein the upper end of the pipe is configured for selective insertion of an elongated tool;

a bearing attached to a lower face of the plate and extending circumferentially around the orifice;

a lower locking nut threadedly attached to the pipe and positioned below the bearing;

a washer positioned between the lower locking nut and the bearing; and an upper locking nut threadedly attached to the pipe and positioned above the plate, such that the upper locking nut and the lower locking nut are positioned for rotatably attaching the plate to the pipe.

9. The method of claim 7, further including:

a ring attached to the perimeter of the plate and extending toward the base;

indicia positioned on an outer face of the ring, each indicium being positioned proximate to a respective one of the hangers and indicating a size of the respective wrench attached to the respective hanger; and the step of rotating the plate to position a respective wrench required for use to a position wherein the wrench is visible to the user is facilitated by viewing the indicium corresponding to the respective wrench.

* * * * *